(No Model.)
L. B. GIBSON.
MOTOR FOR STREET CARS.
No. 384,148. Patented June 5, 1888.
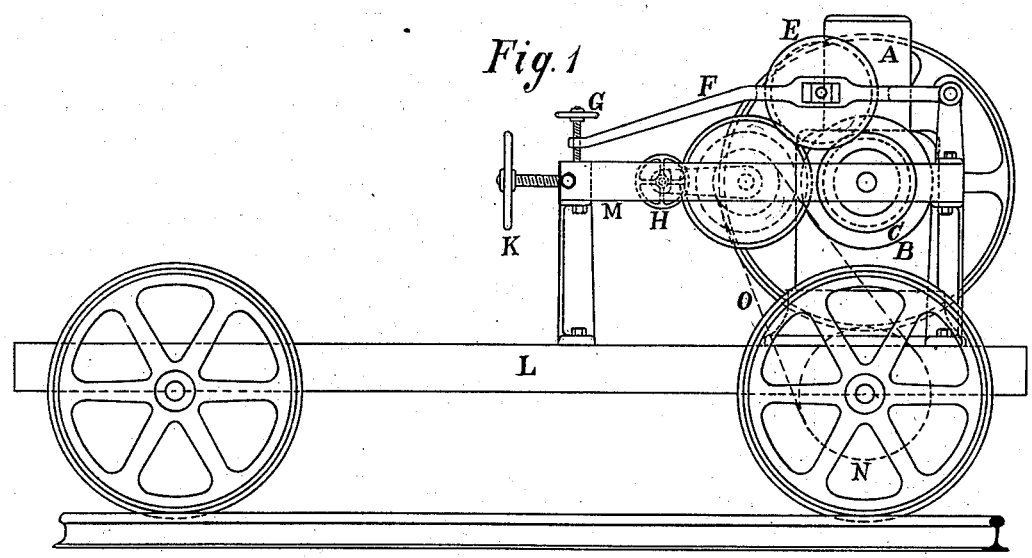
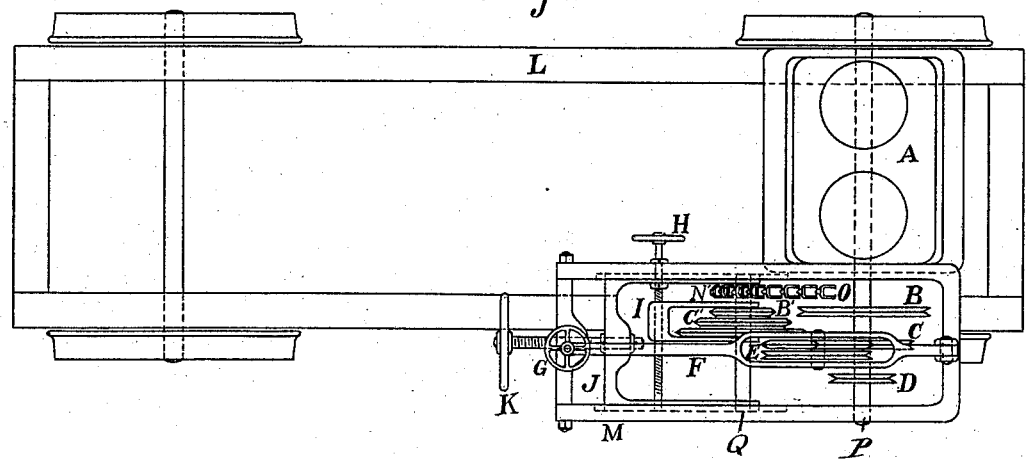
Witnesses
Chas. S. Sturtevant,
F. L. Middleton.
Inventor,
Lucius B. Gibson.
By Attorney Ellis Spear.

UNITED STATES PATENT OFFICE.

LUCIUS B. GIBSON, OF PUEBLO, COLORADO.

MOTOR FOR STREET-CARS.

SPECIFICATION forming part of Letters Patent No. 384,148, dated June 5, 1888.

Application filed April 2, 1888. Serial No. 269,394. (No model.)

*To all whom it may concern:*

Be it known that I, LUCIUS B. GIBSON, of Pueblo, in the county of Pueblo and State of Colorado, have invented a new and useful Improvement in Motors for Street-Cars; and I do hereby declare that the following is a full, clear, and exact description of the same.

The present invention relates to that class of motors described in a series of applications of even date herewith, these motors being intended for the propulsion of street-cars and like vehicles. In the applications referred to the motor is connected to the wheels of the car through a supplemental shaft, upon which are secured friction or sprocket wheels adapted to receive motion from the main shaft of the source of power and to transmit it to the axle of the car. The applications also include means for varying the speed of the car and for reversing its movement.

The present invention is a modification of the devices shown in the applications referred to, and includes other forms of devices for communicating the power from the main shaft to the axle of the car, for changing the speed of said car, and for reversing its movement; and the invention consists in the devices and combination of devices hereinafter to be described.

In the accompanying drawings, Figure 1 is a side elevation of my motor, and Fig. 2 a plan view of the same.

As in the other forms of apparatus, the motor may be of any suitable character, and may be run by gas or oil. A suitable frame supports the motor, which is provided with a balance-wheel, and is preferably mounted at one end of said frame. The main shaft of the motor projects to one side and has its bearings in a supplemental frame, M, which is supported from the main frame of the car by suitable standards. On the projecting end of the main shaft are three friction-wheels, B C D, varying in diameter and all provided with deep peripheral grooves. In the front part of the supplemental frame, in suitable guides in the interior walls thereof, I support a sliding frame, J, which is adjustable back and forth through a screw-threaded rod, K, provided with a suitable handle. In the front part of the sliding frame I form bearings for a shaft, Q, which supports a series of wheels, B' C' D', splined to the shaft, but having lateral movement thereon. These wheels are provided with V-shaped peripheries adapted to fit within the grooved peripheries of the wheels B C D on the main shaft, and thus receive motion from the said main shaft and communicate it to the axle of the car. To allow for this, I provide the shaft Q with a sprocket-wheel, N, which has a chain, O, connecting it with a suitable wheel on the axle. The wheels B' C' D' on the shaft Q are held between a yoke, I, the rear end of which is in connection with a screw-threaded rod, H, provided with a suitable handle, and by operating this rod the wheels on this shaft Q may be adjusted laterally to bring either one or the other of the wheels B' C' D' in connection with the wheels B C D on the main shaft, and as the wheels B' C' D' vary in diameter it will be observed that nine variations in the speed of the car may be effected.

I do not desire to limit myself to the number of wheels shown, as a greater or less number may be used; but I have found that in practice the number I have shown will be sufficient under ordinary circumstances. The frame J is adjusted nearer to or away from the main shaft to engage the different sets of wheels. In order to reverse the movement of the car, I have provided an intermediate connection between the two sets of wheels, as shown at E in the figures. This consists of an arm, F, pivoted at one end above the line of the wheels just described, with its opposite end in connection with a screw-threaded rod, G, operating in a vertical line. This rod is formed as a yoke near its center, and within the opening is mounted a double wheel, e, one of its parts being formed with a V-shaped periphery and the other with a peripheral groove. The V-shaped part is directly above the wheel C of the main shaft, and when it is desired to change the direction of movement this wheel is brought into contact with the wheel C by the adjustment of the arm F. The wheel or wheels upon the supplemental shaft may then be shifted laterally, so that either one or the other will engage with the grooved wheel of the pair, and the movement of the main shaft will thus be communicated to the supplemental shaft through the double wheel, and thus reverse the movement of the car.

I claim—

1. A motor for street-cars, consisting of a source of power, a main shaft, a supplemental frame, friction-wheels on the main shaft varying in diameter, a supplemental shaft adjustable toward or from the main shaft, friction-wheels on the supplemental shaft, adapted to engage with the wheels on the main shaft, connection between said shaft and the car-axle, and means for adjusting the pulleys on the supplemental shaft laterally, substantially as described.

2. A motor for street-cars, consisting of a source of power, a main driving-shaft carrying pulleys varying in diameter, a supplemental shaft carrying splined pulleys varying in diameter, means for adjusting the pulleys laterally, and an intermediate friction-disk between the main and supplemental shafts, adapted to engage the pulleys of both shafts and to transmit the motion of the main shaft to the supplemental shaft and reverse the movement of the car, substantially as described.

3. A motor for street-cars, consisting of a source of power, a main driving-shaft carrying pulleys varying in diameter, a supplemental shaft mounted in a sliding frame, pulleys varying in diameter splined to said shaft, a yoke for said pulleys, means for adjusting said yoke and pulleys laterally, and a driving-connection from the supplemental shaft to the main driving-shaft, substantially as described.

In testimony whereof I have signed my name to this specification in the presence of two subscribing witnesses.

LUCIUS B. GIBSON.

Witnesses:
E. H. MARTIN,
D. J. SIPES.